Feb. 26, 1957     E. H. GATWOOD     2,782,598
POWER TRANSMISSION
Filed May 24, 1955
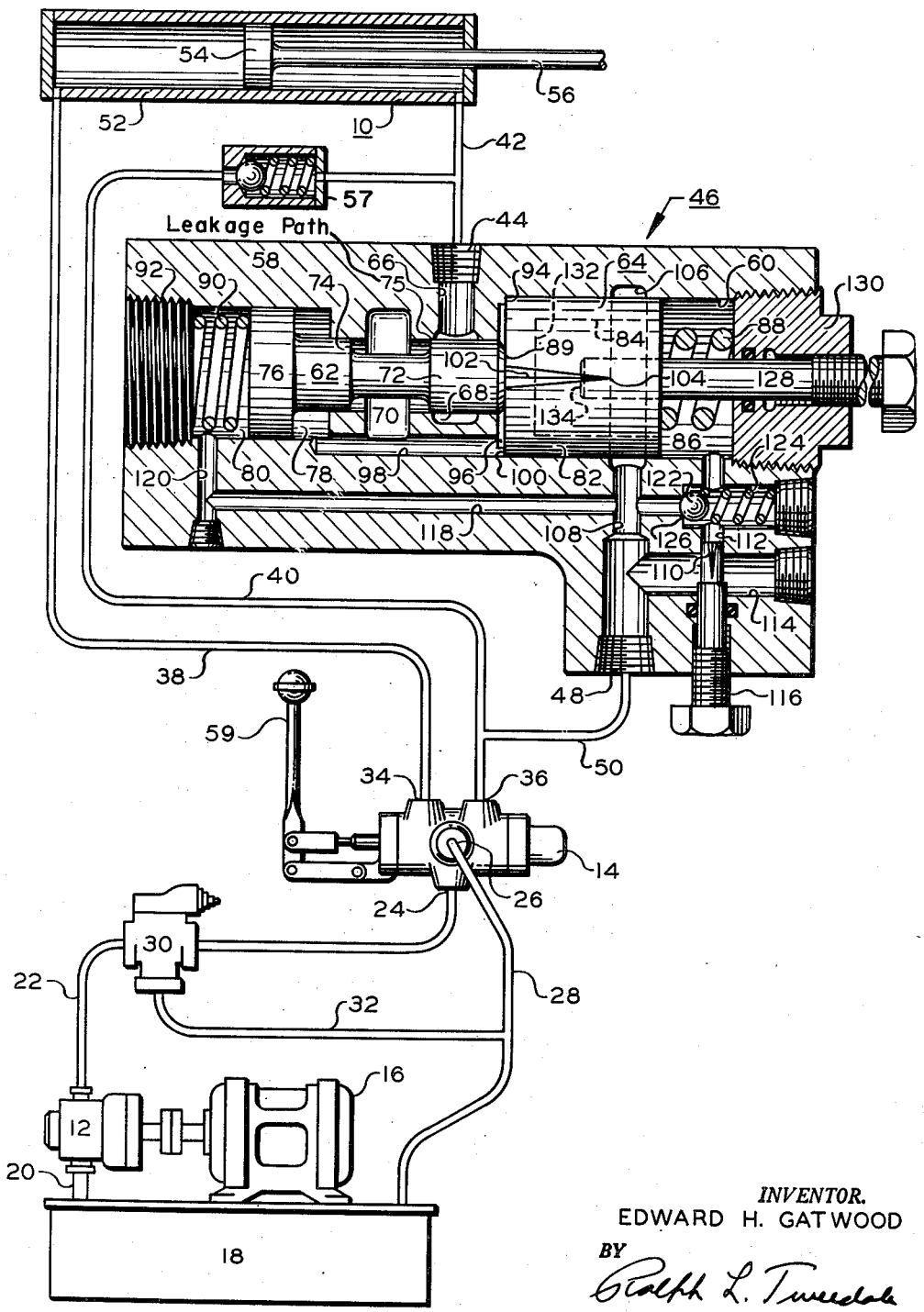
INVENTOR.
EDWARD H. GATWOOD
BY
Ralph L. Tweedale
ATTORNEY

United States Patent Office 2,782,598
Patented Feb. 26, 1957

2,782,598

POWER TRANSMISSION

Edward H. Gatwood, Detroit, Mich., assignor to Vickers Incorporated, Detroit, Mich., a corporation of Michigan Application May 24, 1955, Serial No. 510,625

17 Claims. (Cl. 60—52)

This invention relates to power transmissions, and is particularly applicable to those of the type comprising two or more fluid pressure energy translating devices, one of which may function as a pump and another as a fluid motor.

The invention is more particularly concerned with flow regulating valves which have an important use in hydraulic power transmissions for driving machine tools. They serve the purpose of controlling the speed of the motor for producing a reduced speed rate or feed movement of the machine tool and for driving the same at a constant regulated rate of speed regardless of load resistance.

One type of flow regulating valve used in machine tool transmissions comprises a manually adjustable throttle and a pressure compensating valve for maintaining a regulated flow rate across the throttle. The compensating valve maintains a constant pressure drop across the throttle, and thus the flow rate through the throttle remains constant.

With this type of flow regulating valve some difficulty has been encountered in preventing motor jump when the motor driving machine tool is started in a feed movement from rest or upon resuming a feed movement after interruption. This is due to the fact that when flow through the flow regulating valve is interrupted, the compensating valve which is resiliently biased to the fully open position permits a temporary flow of fluid above the regulated flow rate to pass therethrough before it assumes a normal regulating position. Although this is only a momentary lapse and the compensating valve almost immediately assumes a normal regulating position, the temporary flow in excess of the regulated flow rate causes the motor to jump slightly and in some instances ruin a cutting tool. This is particularly objectionable in machine tools where for some reason it may be necessary to stop the slide during the middle of a cut, and then, if the feeding movement be resumed, the slide jumps ahead momentarily causing breaking of the cutting tool. This difficulty is avoided only by continuous caution of the operator to back the tool away from the work slightly before resuming the feeding movement.

It is therefore an object of this invention to provide an improved flow regulating device which overcomes this difficulty.

It is a further object of this invention to provide an improved type of flow regulating valve wherein the compensating valve is operated to the closed position when flow through the valve ceases and which gradually opens to a regulating position when flow to the flow regulating valve resumes.

It is also an object of this invention to provide an improved type of flow regulating valve wherein the throttle is biased to the closed position and which gradually opens in response to pressure increases when flow to the flow regulating valve resumes.

It is another object of this invention to provide a flow regulating valve of the type recited wherein the throttle is biased to the closed position and also performs the function of biasing the compensating valve to the closed position when flow to the flow regulating valve ceases.

It is still another object of this invention to provide a flow regulating valve of the type recited wherein upon resumption of flow to the flow regulating valve after interruption the throttle is gradually opened to permit gradual opening of the compensating valve to a normal regulating position.

It is also an object of this invention to provide an improved flow regulating valve for controlling the speed of a fluid motor which prevents motor jump when the motor is started from a rest position and having the advantage of providing a smooth adjustable rate of acceleration up to an adjustable regulated motor speed rate.

It is a further object of this invention to provide an improved, simplified, and compact flow regulating valve which is economical to manufacture, and which is efficient in operation over a long and useful life.

Further objects and advantages of the present invention will be apparent from the following description, reference being had to the accompanying drawing wherein a preferred form of the present invention is clearly shown.

In the drawing:

The single figure is a diagrammatic view of a hydraulic power transmission system embodying a preferred form of the present invention.

Referring to the drawing, there is shown a double acting motor 10 for driving a load device such as a machine tool, not shown, and which is driven by a fixed displacement fluid pump indicated by the numeral 12. A manually operated four-way valve 14 is interposed between the pump and motor for controlling the directional operation of the motor. The pump 12 is driven by an electric motor 16 mounted on a reservoir 18 which supplies fluid to the pump 12 by means of a supply conduit 20. The outlet side of the pump 12 is connected by a pressure delivery conduit 22 to a pressure inlet port 24 of the four-way valve 14 while a tank port 26 of the same valve is connected to the reservoir 18 by a return conduit 28. Incorporated in the pressure delivery conduit 22 is a pressure relief valve 30 which determines the maximum operating pressure of the system and which relieves excessive pressure fluid to the reservoir 18 by means of an exhaust conduit 32 connected to the return conduit 28.

The four-way valve 14 is provided with two motor ports 34 and 36, the former of which is connected to the head end of motor 10 by a motor conduit 38. The motor port 36 is connected by a motor conduit 40 to a branch motor conduit 42, one end of which is connected to the rod end of motor 10 while the other end thereof is connected to an inlet port 44 of a flow regulating valve 46. An outlet port 48 of the flow regulating valve 46 is connected by a conduit 50 to the motor conduit 40.

Motor 10 is of the type comprising a cylinder 52 having reciprocally mounted therein a fluid operated piston 54 having connected thereto a piston rod 56 which extends from the cylinder for the purpose of driving the machine tool. A check valve 57 is incorporated in the motor conduit 40 to permit rapid reversal of the motor when the pump is connected by the four-way valve to the rod end of the motor and which directs fluid displacement from the rod end of the motor through the flow regulating valve when the pump is connected to the head end of the motor for the purpose of producing a feed movement of the motor.

The four-way valve 14 is provided with a control handle 59 which in the position shown stops the motor by causing all ports of the valve to be blocked from communication with each other. When the handle is shifted to either side of the neutral position, the pressure port 24 is connected to one of the motor ports 34 or 36 while the remaining motor port is connected to the reservoir.

The flow regulating valve 46 comprises a body 58 having a longitudinal bore 60 within which is mounted a pressure compensating valve indicated generally by the numeral 62 and an immediately adjacent throttle valve indicated generally by the numeral 64. The compensating valve is adapted to maintain a constant pressure drop across the throttle valve and thus the flow therethrough constant for controlling the speed of the motor in one direction of its operation.

The inlet port 44 of the flow regulating valve 46 is connected by an inlet passage 66 to an inlet port 68 on the bore 60 and which is closed, except for a leakage path, from communication with a spaced apart outlet port 70 of the bore 60 by a controlling or metering land 72 formed at one end of a control piston 74 of the compensating valve 62. The leakage path formed between the blocking surface of the land 72 and the wall of the bore 60 is indicated by the numeral 75. An operating piston 76 for the control piston 74 is reciprocally mounted in an enlarged end portion of the bore 60 to form chambers 78 and 80 on opposite sides of the operating piston 76.

The throttle valve 64 comprises a piston 82 which is hollow to form a chamber therein 84 opening to the other enlarged end of bore 60 indicated by the numeral 86. A spring 88 of predetermined resistance biases the piston 82 leftwardly in engagement against the end surface of land 72 indicated by the numeral 89 for shifting the compensating valve 62 to the closed position shown when flow to the flow regulating valve ceases. The compensating valve 62 is provided with an operating spring 90 which is mounted in the chamber 80 abutting the operating piston 76 and a plug 92 closing the left end of bore 60.

The operating force of the spring 90 is smaller than the operating force of the throttle valve spring and determines the pressure drop across the throttle valve 64 and thus the flow rate therethrough. The leftward movement of the throttle piston 82 and thus the extreme closed position of the compensating valve is limited by a shoulder 94 of the bore 60 which forms a chamber 96 at one side of the piston 82 to which fluid is conducted by a passage 98. The passage 98 is connected at an intermediate portion thereof to the compensating valve bore port 70 and at opposite ends to the compensating valve chamber 78 and to the chamber 98 in which is exposed an end operating surface of the hollow piston 82 indicated by the numeral 100.

The piston 82 has a tapered V-shaped groove notched in the wall thereof forming a throttling portion 102, the tip of which is indicated by the numeral 104. In the closed position of the throttle valve 64 shown, the tip 104 lies just short of communication or substantially line-to-line with a grooved port 106 of the bore 60 which is connected by an outlet passage 108 to the outlet port 48 of the flow regulating valve. When the pump is connected to the head end of motor 10, a pressure increase is produced at the rod end of the motor which is transmitted to the operating surface 100 of the throttle valve to shift the same rightwardly. As the throttling valve is operated rightwardly in response to pressure increases in the chamber 96, the tip 104 of the throttle 102 breaks over the port 106 and a continued shifting of the throttle valve permits a gradual opening of the throttle 102.

The rate at which the throttle opens may be controlled by metering the displacement from the chamber 86 through a needle valve 110 incorporated in a passage 112 leading from the chamber 86 and which is connected to outlet passage 108 by a branch passage 114. An adjustment member 116 is threadably inserted in the passage 112 and extends outside the valve body from the passage for external adjustment of the needle valve 110 to control the rate at which the throttle opens.

For the purpose of transmitting pressure beyond the throttle valve to the chamber 80 of the compensating valve, a control passage 118 is constructed in the valve body 58 which intersects outlet passage 108 and leads to the chamber 80 by a branch passage 120. The opposite end of control passage 118 leads to the passage 112 and a check valve 122 is mounted in an enlarged portion of the passage to permit flow into the chamber 86 of the throttle valve when it is operated to the closed position. A spring 124 biases the check valve 122 to the closed position against a seat 126 formed in the passage 118 for preventing flow from the chamber 86 to the passage 112 and through the needle valve 110 when the throttle valve is operated to the opened position.

The opening of the throttle 102 may be adjusted for determining the feed rate of the motor 10 by an adjustable abutment member 128 threaded into a bore closure plug 130 and which extends into the hollow portion or chamber 84 of the piston 82. The movement of the piston 82 is limited by the inner wall surface of the piston indicated by the numeral 132 coming in contact with an end surface 134 of the adjustment member 128.

With the pump 12 being operated by electric motor 16 and the control handle 59 of directional valve 14 shifted from the motor stop position shown to connect the pressure port 24 to motor port 36 and motor port 34 to tank port 26, the motor 10 will be operated in a leftward rapid traverse movement. Pump displacement is conducted to the rod end of motor 10 by means of conduits 22 and 40, check valve 57, and conduit 42. The displacement from the head end of motor 10 is conducted to reservoir 18 by means of conduits 38 and 28. The throttle valve and compensating valve of the flow regulating valve will have been shifted to and will remain in the closed position shown.

When the motor has completed its leftward directional operation and the control handle 59 of the directional valve 14 is shifted completely in the opposite direction, the pressure port 24 of the valve will be connected to motor port 34, and the motor port 36 will be connected to the tank port 26. The outlet side of the pump 12 is thus connected to the head end of motor 10 by conduits 22 and 38, while the rod end of the motor is connected to the tank by means of conduit 42, flow regulating valve 46, and conduits 50, 40, and 28. With the compensating valve 62 and throttle valve 64 in the closed position shown, the rod end of the motor is temporarily blocked from communication with the reservoir at the flow regulating valve, and pressure in the system will build up to the setting of the relief valve 30. The piston 54 of the motor 10 starts to be slowly actuated because of leakage across the land 72 of the compensating valve through the restricted flow path indicated by the numeral 75 which is conducted by bore 60, valve port 70, and the passage 98 to chamber 96 wherein is exposed the end operating surface 100 of the throttling piston 82. The throttling piston 82 will be shifted rightwardly against the resistance of spring 88, and the tip 104 of the throttling portion 102 will pass over bore port 106. The throttling piston 82 will continue to shift rightwardly at a rate dependent upon the displacement of fluid from chamber 86 which must pass through the adjustable needle valve 110 in the passage 112. As the hollow piston 82 is shifted rightwardly, the increasing enlarging throttling portion 102 gradually passes over the port 106 to permit a gradually increasing amount of fluid to pass through the throttle 102. The fluid displaced from chamber 86 is conducted to reservoir 18 by means of passages 112, 114, and 108, outlet port 48, and conduits 50, 40, and 28.

During the opening of the throttle the spring 90 of compensating valve 62 shifts the compensating valve to an open, regulating position to maintain a constant flow through the throttle for every opening thereof. The valve bore port 68 is opened to communication with the valve bore port 70, and the land 72 will meter flow in response to the pressure across the throttle 102. Pressure ahead of throttle 102 is transmitted to compensating valve chamber 78 to act on the underside of operating piston 76 by means of passage 98 and is also transmitted to chamber 96 of the throttle valve to act on the exposed surface therein of compensating valve land 72 by the same passage. Pressure beyond the throttle 102 is transmitted to chamber 80 to act on the opposite side of operating piston 76 by means of valve bore port 106, and passages 108, 118, and 120. The compensating valve will modulate as do conventional compensating valves of this type to maintain the pressure drop across the throttle 102 constant and thus the flow rate through the throtle 102 constant for given adjustable openings of the throttle. The pressure drop is determined by the bias force of spring 90. The displacement of the motor is thus controlled by the flow regulating valve to produce a controlled feed movement of the motor.

If the motor 10 is stopped during a feed movement by shifting the control handle 59 of the directional valve 14 to the neutral motor stop position shown, flow to the flow regulating valve port 44 ceases. The spring 88 of the throttling piston 82 shifts the same towards the closed position while temporarily the compensating valve is shifted towards the throttling valve by its operating spring 90 and towards the fully opened position. Fluid is displaced from the contracting chambers 96 and 78 of the throttling and compensating valves to the expanding chambers 86 and 80 of the respective valves. When the operating surface 100 of throttling valve 82 contacts the end surface 89 of land 72 of the compensating valve 62, the compensating valve will be shifted towards the closed position by reason of the stronger operating spring 88 of throttling valve 82. Fluid displacement from the now contracting chamber 80 of the compensating valve 62 is conducted to the expanding chamber 86 of throttling valve 64 by passages 120 and 118, check valve 122, and passage 112. An interchange of fluid also takes place between the contracting and expanding chambers 96 and 78 respectively of the throttling and compensating valves.

If the feed movement of the motor is resumed after this interruption, both the throttle valve and the compensating valve will be in the closed positions shown, and the gradual opening of the throttle 102 to its fully open, adjustably limited position and the opening of the compensating valve to a regulating position will be as previously described.

The invention thus provides a flow regulating valve which prevents motor jump when the motor is started from rest in a regulated feed movement or when the feed movement is resumed after interruption. With both the throttle valve and the compensating valve in the closed positions when the motor is started or re-started in a feed position, no flow is permitted through the flow regulating valve until the throttle is cracked to the slightly open position. A quantity of fluid much less than the normal regulated displacement of the motor is utilized to slowly shift the throttle valve from a fully closed position to a slightly opened position. The operation of the throttle valve to the adjustable, fully opened throttling position is regulated or controlled by a needle valve which in controlling the movement of the throttle valve also controls the shifting of the compensating valve from the closed to a regulating position. In addition, the throttle formed in the throttle valve is of tapered construction to permit a gradually increasing amount of flow through the same up to the adjustably regulated amount as it passes over the porting connected to the outlet port of the flow regulating valve. The combination of structure provided thus results in a smooth acceleration of the motor up to the regulated feed speed, the rate of which may be controlled by the single adjusting means provided for the needle valve.

While the form of embodiment of the invention as herein disclosed constitutes a preferred form, it is to be understood that other forms might be adopted, all coming within the scope of the claims which follow.

What is claimed is as follows:

1. A flow regulating valve for controlling flow in hydraulic power transmission systems comprising a throttle through which fluid is adapted to flow at a regulated rate, a pressure compensating valve for maintaining a substantially constant pressure drop across the throttle to regulate the flow rate therethrough, resilient means shifting the throttle to a closed position when flow to the flow regulating valve ceases, and pressure responsive means for operating the throttle to a predetermined throttling position when flow to the flow regulating valve is initiated.

2. A flow regulating valve for controlling flow in hydraulic power transmission systems comprising a throttle through which fluid is adapted to flow at a regulated rate, a pressure compensating valve for maintaining a substantially constant pressure drop across the throttle to regulate the flow rate therethrough, resilient means shifting the throttle to a closed position when flow to the flow regulating valve ceases, pressure responsive means for operating the throttle to a predetermined throttling position when flow to the flow regulating valve is initiated, and means for regulating the rate at which said throttle is operated from the closed to the open throttling position.

3. A flow regulating valve for controlling flow in hydraulic power transmission systems comprising a throttle through which fluid is adapted to flow at a regulated rate, a pressure compensating valve for maintaining a substantially constant pressure drop across the throttle to regulate the flow rate therethrough, resilient means shifting the throttle to a closed position when flow to the flow regulating valve ceases, pressure responsive means for operating the throttle to a predetermined throttling position when flow to the flow regulating valve is initiated, and adjustable means for limiting the operation of the throttle for determining the said throttling position of the throttle.

4. A flow regulating valve for controlling flow in hydraulic power transmission systems comprising a throttle through which fluid is adapted to flow at a regulated rate, a pressure compensating valve for maintaining a substantially constant pressure drop across the throttle to regulate the flow rate therethrough, said compensating valve including biasing means tending to shift the valve to a fully open non-regulating position when flow to the flow regulating valve is interrupted, resilient means shifting both the compensating valve and the throttle to a closed position when flow to the flow regulating valve is interrupted, and pressure responsive means for operating the throttle to an open throttling position and the compensating valve to a regulating position when flow to the flow regulating valve is initiated.

5. A flow regulating valve for controlling flow in hydraulic power transmission systems comprising a throttle through which fluid is adapted to flow at a regulated rate, a pressure compensating valve for maintaining a substantially constant pressure drop across the throttle to regulate the flow rate therethrough, said compensating valve including biasing means tending to shift the valve to a fully open non-regulating position when flow to the flow regulating valve is interrupted, resilient means shifting both the compensating valve and the throttle to a closed position when flow to the flow regulating valve is interrupted, pressure responsive means for operating the throttle to an open throttling position and the compensating valve to a regulating postion when flow to the flow regulating valve is initiated, and means for regulating the rate at which said throttle is operated from the closed to the open throttling position.

6. A flow regulating valve for controlling flow in hydraulic power transmission systems comprising a throttle through which fluid is adapted to flow at a regulated rate, a pressure compensating valve for maintaining a substantially constant pressure drop across the throttle to regulate the flow rate therethrough, said compensating valve including biasing means tending to shift the valve to a fully open non-regulating position when flow to the flow regulating valve is interrupted, resilient means shifting both the compensating valve and the throttle to a closed position when flow to the flow regulating valve is interrupted, pressure responsive means for operating the throttle to an open throttling position and the compensating valve to a regulating position when flow to the flow regulating valve is initiated, and adjustable means for limiting the operation of the throttle for adjusting the size of the throttle opening.

7. A flow regulating valve for controlling flow in hydraulic power transmission systems comprising a throttle through which fluid is adapted to flow at a regulated rate, a pressure compensating valve for maintaining a substantially constant pressure drop across the throttle to regulate the flow rate therethrough, said compensating valve including biasing means tending to shift the valve to a fully open non-regulating position when flow to the flow regulating valve is interrupted, resilient means shifting both the compensating valve and the throttle to a closed position when flow to the flow regulating valve is interrupted, pressure responsive means for operating the throttle to an open throttling position and the compensating valve to a regulating position when flow to the flow regulating valve is initiated, means for regulating the rate at which said throttle is operated from the closed to the throttling position, and adjustable means for limiting the operation of the throttle for adjusting the size of the throttle opening.

8. A flow regulating valve for controlling flow in hydraulic power transmission systems comprising in combination means forming a flow passage, in series in said passage a throttle through which fluid is adapted to flow at a regulated rate and a pressure compensating valve, operating means for the compensating valve responsive to the pressures ahead of and beyond the throttle for causing the compensating valve to maintain a regulated flow rate through the throttle, and operating means for the throttle shifting the throttle to a closed position to close the passage when flow to the passage in interrupted, said operating means being responsive to pressure increases when flow to the passage is initiated to shift said throttle from the closed to an open throttling position.

9. A flow regulating valve for controlling flow in hydraulic power transmission systems comprising in combination means forming a flow passage, in series in said passage a throttle through which fluid is adapted to flow at a regulated rate and a pressure compensating valve, operating means for the compensating valve responsive to the pressures ahead of and beyond the throttle for causing the compensating valve to maintain a regulated flow rate through the throttle, operating means for the throttle shifting the throttle to a closed position to close the passage when flow to the passage is interrupted, said operating means being responsive to pressure increases when flow to the passage is initiated to shift said throttle from the closed to an open throttling position, and means for regulating the rate at which said throttle is operated from the closed to the open throttling position.

10. A flow regulating valve for controlling flow in hydraulic power transmission systems comprising in combination means forming a flow passage, in series in said passage a throttle through which fluid is adapted to flow at a regulated rate and a pressure compensating valve, operating means for the compensating valve responsive to the pressures ahead of and beyond the throttle for causing the compensating valve to maintain a regulated flow rate through the throttle, and tending to shift the compensating valve to a fully open, non-regulating position when flow to the flow passage is interrupted, and resilient means operating both the throttle and the compensating valve to closed positions to close the passage when flow to the flow passage is interrupted, said resilient means being responsive to pressure increases when flow to the passage is initiated for operating the throttle to an open throttling position and permitting the compensating valve to assume a flow regulating operating position.

11. A flow regulating valve for controlling flow in hydraulic power transmission systems comprising in combination means forming a flow passage, in series in said passage a throttle through which fluid is adapted to flow valve, operating means for the compensating valve operating means for the compensating valve responsive to the pressures ahead of and beyond the throttle for causing the compensating valve to maintain a regulated flow rate through the throttle, and tending to shift the compensating valve to a fully open, non-regulating position when flow to the flow passage is interrupted, resilient means operating both the throttle and the compensating valve to closed positions to close the passage when flow to the flow passage is interrupted, said resilient means being responsive to pressure increases when flow to the passage is initiated for operating the throttle to an open throttling position and permitting the compensating valve to assume a flow regulating operating position, and means for regulating the rate at which said throttle is operated from the closed to the open throttling position.

12. A flow regulating valve for controlling flow in hydraulic power transmission systems comprising in combination means forming a flow passage, in series in said passage a throttle through which fluid is adapted to flow at a regulated rate and a pressure compensating valve, operating means for the compensating valve responsive to the pressures ahead of and beyond the throttle for causing the compensating valve to maintain a regulated flow rate through the throttle, and tending to shift the compensating valve to a fully open, non-regulating position when flow to the flow passage is interrupted, resilient means operating both the throttle and the compensating valve to closed positions to close the passage when flow to the flow passage is interrupted, said resilient means being responsive to pressure increases when flow to the passage is initiated for operating the throttle to an open throttling position and permitting the compensating valve to assume a flow regulating operating position, means for limiting the operation of the throttle to adjust the size of the throttle opening, and means for regulating the rate at which said throttle is operated from the closed to the adjusted open throttling position.

13. In a hydraulic power transmission system having a fluid pump, a fluid motor and control means for selectively operating the motor and interrupting fluid flow to the motor for stopping the same, a flow regulating valve for controlling the speed of the motor comprising in combination means forming a flow passage connected to the motor, a throttle and a pressure compensating valve in the passage, operating means for the compensating valve causing the same to maintain a substantially constant pressure drop across the throttle to regulate the flow rate therethrough, and resilient means operating the throttle to a closed position for closing the flow passage when the motor is stopped, said resilient means being responsive to pressure increases when flow to the motor is initiated for starting the same to operate the throttle to an open throttling position.

14. In a hydraulic power transmission system having a fluid pump, a fluid motor and control means for selectively operating the motor and interrupting fluid flow to the motor for stopping the same, a flow regulating valve for controlling the speed of the motor comprising in combination means forming a flow passage connected to the motor, a throttle and a pressure compensating valve in the passage, operating means for the compensating valve causing the same to maintain a substantially constant pressure drop across the throttle to regulate the flow rate therethrough, resilient means operating the throttle to a closed position for closing the flow passage when the motor is stopped, said resilient means being responsive to pressure increases when flow to the motor is initiated for starting the same to operate the throttle to an open throttling position, and means for regulating the rate at which said throttle is operated from the closed to the open throttling position.

15. In a hydraulic power transmission system having a fluid pump, a fluid motor and control means for selectively operating the motor and interrupting fluid flow to the motor for stopping the same, a flow regulating valve for controlling the speed of the motor comprising in combination means forming a flow passage connected to the motor, a throttle and a pressure compensating valve in the passage, operating means for the compensating valve causing the same to maintain a substantially constant pressure drop across the throttle to regulate the flow rate therethrough, resilient means operating the throttle to a closed position for closing the flow passage when the motor is stopped, said resilient means being responsive to pressure increases when flow to the motor is initiated for starting the same to operate the throttle to an open throttling position, and means for limiting the operation of the throttle to the open position for adjusting the size of the throttle opening.

16. In a hydraulic power transmission system having a fluid pump, a fluid motor and control means for selectively operating the motor and interrupting fluid flow to the motor for stopping the same, a flow regulating valve for controlling the speed of the motor comprising in combination means forming a flow passage connected to the motor, a throttle and a pressure compensating valve in the passage, operating means for the compensating valve causing the same to maintain a substantially constant pressure drop across the throttle to regulate the flow rate therethrough, and resilient means operating both the throttle and the compensating valve to closed positions when the motor is stopped for closing the flow passage, said resilient means being responsive to pressure increases when flow to the flow passage is initiated for operating the throttle to an open throttling position and for permitting the compensating valve to assume an operating position for regulating the flow through the throttle.

17. In a hydraulic power transmission system having a fluid pump, a fluid motor and control means for selectively operating the motor and interrupting fluid flow to the motor for stopping the same, a flow regulating valve for controlling the speed of the motor comprising in combination means forming a flow passage connected to the motor, a throttle and a pressure compensating valve in the passage, operating means for the compensating valve causing the same to maintain a substantially constant pressure drop across the throttle to regulate the flow rate therethrough, resilient means operating both the throttle and the compensating valve to closed positions when the motor is stopped for closing the flow passage, said resilient means being responsive to pressure increases when flow to the flow passage is initiated for operating the throttle to an open throttling position and for permitting the compensating valve to assume an operating position for regulating the flow through the throttle, and means for regulating the rate at which said throttle is operated from the closed to the open throttling position.

References Cited in the file of this patent

UNITED STATES PATENTS 2,487,520     Brown _____ Nov. 8, 1949